March 16, 1937.   C. E. FRUDDEN ET AL   2,073,613
MOTOR VEHICLE
Filed June 13, 1935   4 Sheets-Sheet 4

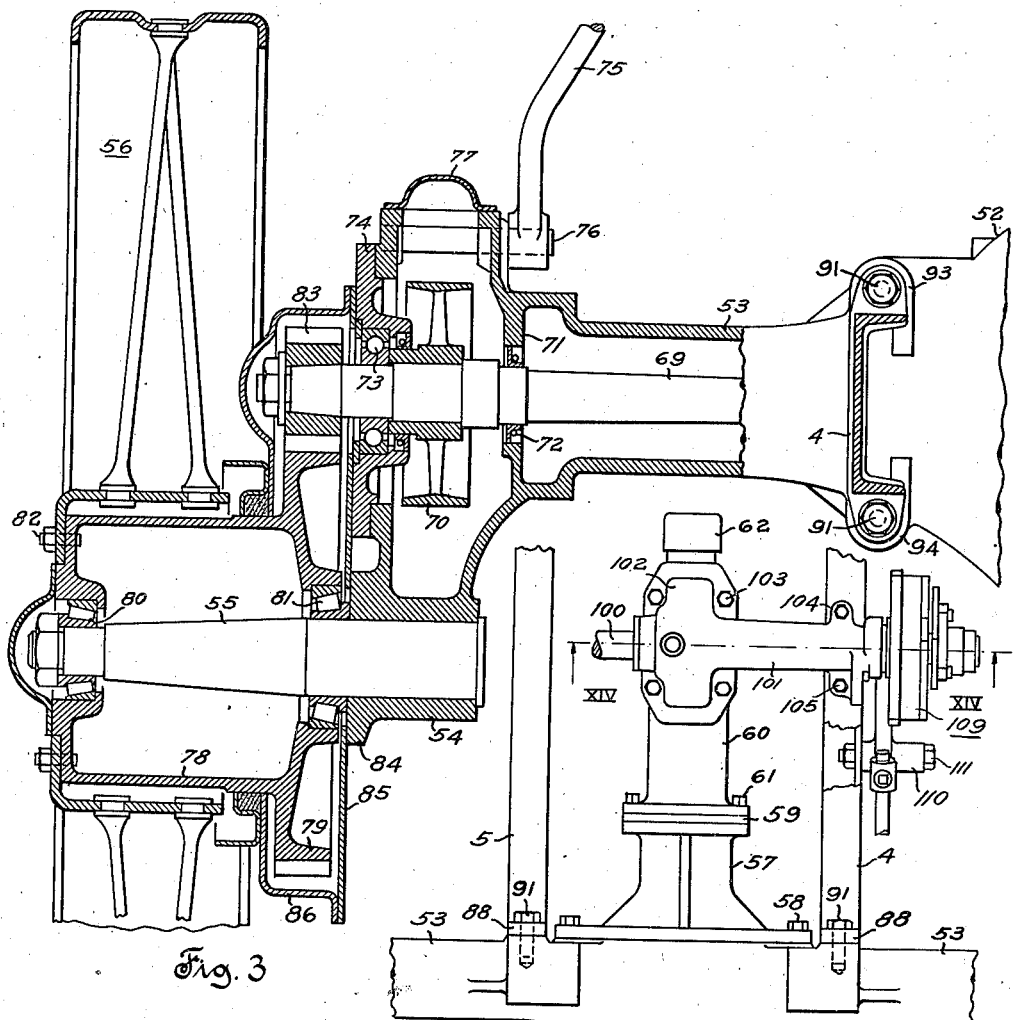
Fig. 3
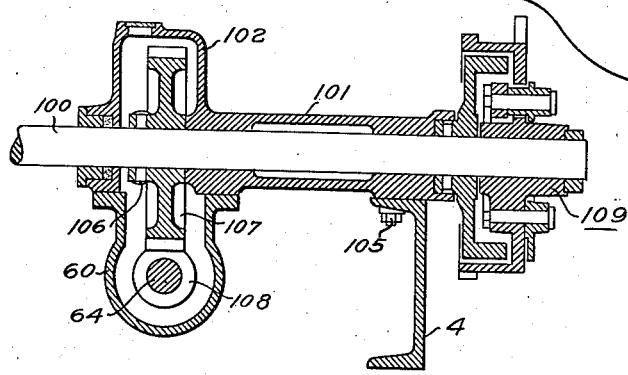
Fig. 14
Fig. 13

Inventors
C. E. Frudden
W. J. Strehlow
by
H. J. DeVere
Attorney

Patented Mar. 16, 1937

2,073,613

UNITED STATES PATENT OFFICE 2,073,613

MOTOR VEHICLE

Conrad E. Frudden, Wauwatosa, and Walter F. Strehlow, Milwaukee, Wis., assignors to Allis-Chalmers Manufacturing Company, Milwaukee, Wis., a corporation of Delaware Application June 13, 1935, Serial No. 26,352

10 Claims. (Cl. 180—54)

This invention relates to motor vehicles and is concerned more particularly with the production of a motor vehicle embodying features of improved construction, performance and operation. Subject matter disclosed but not specifically claimed herein is claimed in application Serial No. 94,016, filed August 3, 1936, Conrad E. Frudden, Pulley attachment for tractors, and in application Serial No. 93,955, filed August 3, 1936, Walter F. Strehlow, Lubricating system.

It is an object of the invention to provide improved means for positioning and retaining a number of units each forming a part of the vehicle, such as a front wheel unit, an engine and transmission unit and a rear axle unit, in a predetermined relation to each other.

Another object of the invention is to provide improved means for positioning and retaining the units in such accurate relation to each other that it will be unnecessary to use universal joints for connecting driving and driven shafts carried by such units, respectively, the relative positions of the units, as afforded by the improved positioning and retaining means, being sufficiently accurate and definite to permit connecting of the shafts by sleeve couplings or similarly rigid coupling devices which are less expensive and otherwise more desirable than universal joints.

Another object of the invention is to provide a motor vehicle of the indicated type, which may be readily assembled in the process of manufacture and disassembled for purposes of inspection and repair, and which, after such inspection and repair, may be reassembled with a minimum of labor and skill.

These and other objects and advantages of the invention will be apparent from the following description. A clear conception of an embodiment of the invention and of the operation of a device constructed in accordance therewith may be had by referring to the drawings accompanying and forming a part of this specification in which like reference characters designate the same or similar parts in the various views.

Fig. 3 is a view showing a partial section on line III—III of Fig. 1 and a forward part of the rear axle housing in elevation to disclose the mounting of the right frame channel thereon, the channel being shown in transverse section.

Figure 1:
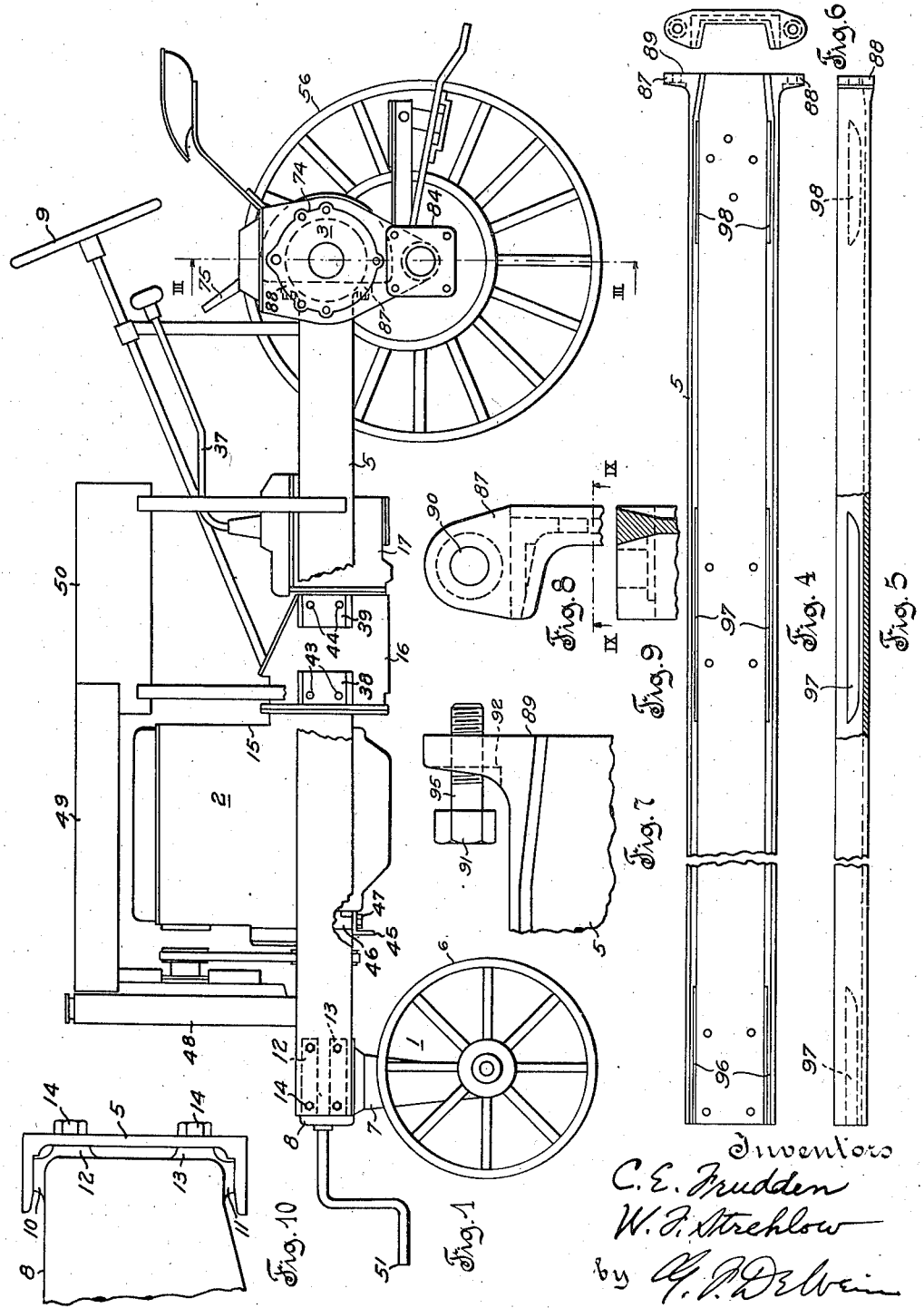
Fig. 1 is a side view of an agricultural tractor, one of the rear wheels, viz. the one at the left side of the tractor, being removed and portions of the left frame channel being broken away for purposes of disclosure.

Figs. 4, 5, and 6 are side, top and end views, respectively, of the frame channel at the left side of the tractor shown in Fig. 1.

Figs. 7 and 8 are enlarged side and end views, respectively, of one of the mounting lugs formed on the channel shown in Figs. 4, 5, and 6.

Fig. 9 is a section on line IX—IX of Fig. 8.

Fig. 10 is an enlarged front view of the frame channel at the left side of the tractor shown in Fig. 1 and of an adjacent portion of the front wheel support.

Figure 2:
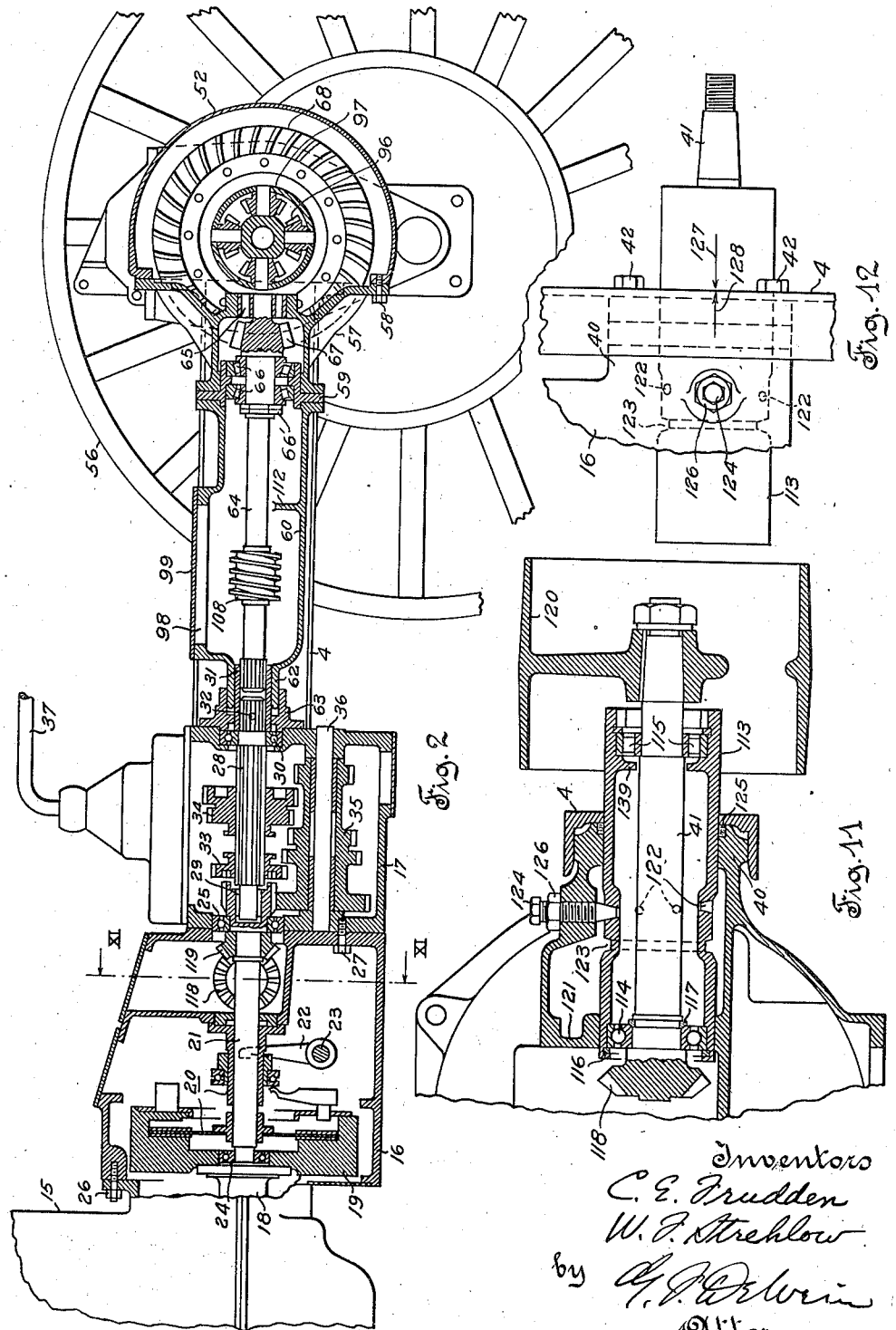
Fig. 2 is a section through the rear half of the tractor shown in Fig. 1, the section being taken on a vertical central plane at right angles to the axes of the rear wheels.

Fig. 11 is an enlarged partial section on line XI—XI of Fig. 2 showing a belt pulley mounted on the tractor shown in Fig. 1 at the side of the right frame channel thereof.

Fig. 12 is a top view of the belt pulley assembly shown in Fig. 11, the belt pulley itself being removed in Fig. 12 from its supporting shaft.

Fig. 13 is a partial top view of the rear end of the tractor shown in Fig. 1, a power takeoff mechanism for lifting an agricultural implement or the like being shown attached to the tractor.

Fig. 14 is an enlarged section on line XIV—XIV of Fig. 13.

Figure 15:
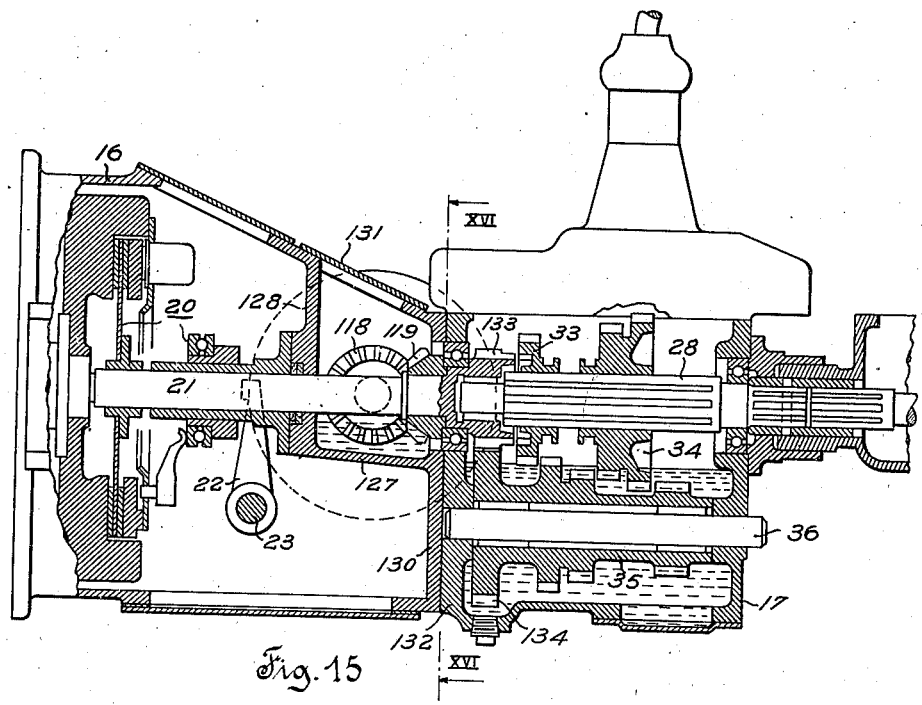

Fig. 15 is an enlarged sectional view of a clutch and change speed transmission mechanism for use in a tractor as shown in Fig. 1, and also showing drive gears for a belt pulley shaft.

Figure 16:
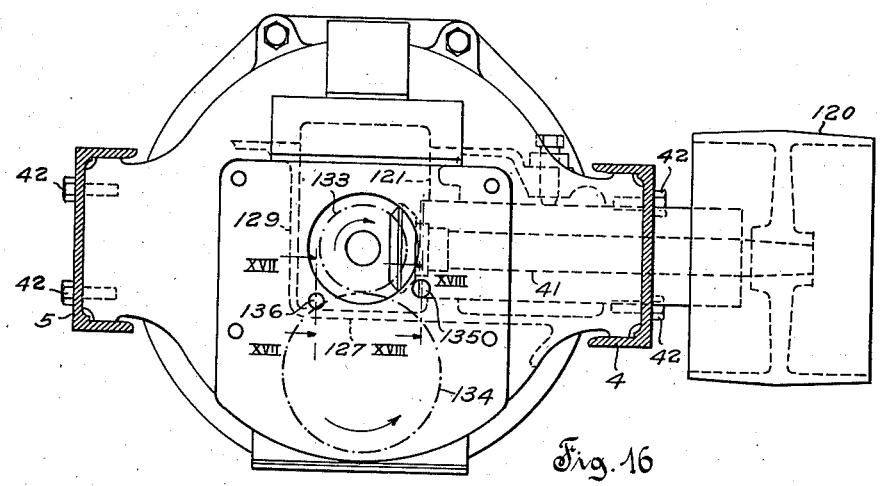

Fig. 16 is a view looking in the direction of arrows XVI—XVI in Fig. 15 upon the end wall of the clutch housing which in Fig. 15 abuts against the housing of the change speed transmission mechanism.

Figures 17, 18:
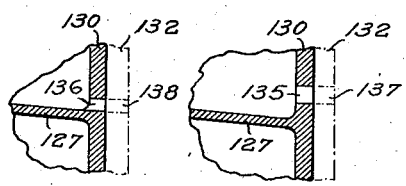

Fig. 17 is an enlarged section on line XVII—XVII in Fig. 16; and

Fig. 18 is an enlarged section on line XVIII—XVIII in Fig. 16.

The tractor shown in Fig. 1 comprises three major units, namely, a front wheel unit generally indicated by the reference character 1, an engine and transmission unit generally indicated by the reference character 2, and a rear axle unit generally indicated by the reference character 3, and right and left frame channels 4 and 5, respectively, secured to the units.

The front wheel unit consists of a pair of steering wheels 6 positioned in proximity to each other at opposite sides of a vertical longitudinal plane centrally of the tractor, and a front wheel support having a vertical tubular portion 7 and an upper housing portion 8 extending transversely to said vertical longitudinal plane. The wheels 6 are mounted on an axle at the lower end of the tubular portion 7 and are steerable by the hand wheel 9 through a vertical steering spindle in the tubular portion 7 and a worm and gear mechanism in the upper housing portion 8, as will be understood without further description. The upper housing portion 8 has a substantially horizontal top wall, vertical side walls and a bottom wall merging with the tubular portion 7. The portions at the top wall adjoining the vertical side walls are each provided with a pad 10, one of which is shown in Fig. 10 in contact with the upper flange of the frame channel 5, the other pad 10 being similarly disposed on the opposite portion of the housing 8, which is not shown in Fig. 10, and similarly in contact with the upper flange of the frame channel 4. The portions of the bottom wall of the casing 8, adjoining the vertical side walls thereof are each provided with a pad 11 similar to the pad 10, one of the pads 11 being shown in Fig. 10 in contact with the lower flange of the frame channel 5, and the other pad 11 being similarly disposed in contact with the lower flange of the frame channel 4. It should be noted that the pads 10 have a straight horizontal top surface and the pads 11 a straight horizontal bottom surface, and that the top and bottom flanges of the channel 5 are faced at their relatively opposed sides to receive the straight horizontal surfaces of the pads 10 and 11 between them. The same arrangement exists between the flanges of the channel 4 and the pads 10 and 11 at the portion of the housing 8 opposite to that shown in Fig. 10. The web of the channel 5 abuts against an upper pad 12 and a lower pad 13 projecting from the vertical side wall of the housing 8 at the left side of the tractor as may be seen from Figs. 1 and 10, and the web of the channel 4 abuts against similar pads 12 and 13 projecting from the vertical side wall of the housing 8 at the right side of the tractor, the arrangement corresponding to that shown in Fig. 10. The channels 4 and 5 are drawn up tight against the pads 12 and 13 by bolts 14.

The engine and transmission unit consists of an internal combustion engine including a cylinder block 15, a clutch mechanism including a housing 16 bolted to the cylinder block 15, and a change speed transmission mechanism including a housing 17 bolted to the clutch housing 16. The internal combustion engine includes a crank shaft 18 (Fig. 2) which carries on its rear end a flywheel 19 and which is connected by a dry clutch mechanism 20 with a clutch shaft 21. A clutch operating fork 22 is mounted on a shaft 23 journaled in the clutch housing 16 and extending laterally therefrom as will be understood. The forward end of the clutch shaft 21 is journaled in a ball bearing 24 seated in the flywheel 19, and the rear end of the clutch shaft 21 is journaled in a ball bearing 25 partly seated in the vertical end wall of the clutch housing 16 and partly seated in the vertical front wall of the transmission housing 17 abutting against the end wall of the clutch housing 16. The clutch housing 16 is bolted to the cylinder block 15 as indicated at 26, and the transmission housing 17 is bolted to the clutch housing 16 as indicated at 27, and the engine, clutch housing and transmission housing are thereby rigidly connected to each other and form a unit. The rear end of the clutch shaft 21 extends into the transmission housing 17 and has a central bore in which the front end of a power shaft or variable speed shaft 28 is journaled by means of a roller bearing 29.

The rear end of the power shaft 28 is journaled in a ball bearing 30 which is seated in the vertical rear wall of the transmission housing 17. The power shaft 28 has a splined end portion extending rearwardly from the ball bearing 30, and an internally splined coupling sleeve 31 embracing the splined end portion is secured thereto by a rivet 32. The coupling sleeve 31 abuts against the inner race of the ball bearing 30 which, in turn, abuts against a shoulder on shaft 28. The inner race of the ball bearing 30 is thus prevented from axial displacement on the shaft 28. The change speed transmission mechanism within the housing 17 requires no further description as it is of standard construction involving sliding gears 33 and 34 and a counter shaft gear 35 journaled on a counter shaft 36. A gear shift lever 37 serves to shift the sliding gears 33 and 34 by means of conventional mechanism.

The frame channels 4 and 5 are secured to the clutch housing 16 in somewhat the same manner as has been explained in connection with the upper housing portion 8 of the front wheel support. That is, the clutch housing has on its left side a mounting lug 38, as shown in Fig. 1, and a similar mounting lug at its other side, directly opposite the mounting lug 38. Another mounting lug 39 is formed on the left side of the clutch housing, rearwardly of the mounting lug 38, as shown in Fig. 1, and on its right side the clutch housing has a mounting lug 40, directly opposite to the mounting lug 39. As may be seen from Figs. 11 and 12, however, the mounting lug 40 differs from the mounting lug 39 in that it has a bore in it on a horizontal transverse axis, through which bore a belt pulley shaft 41 is led out of the clutch housing, as will be described later. For the time being it suffices to say that the lug 40 is of somewhat greater width, longitudinally of the tractor, than the lug 39 on account of the bore therein. The mounting lugs 38 and 39 at the left side of the clutch housing have upper pads similar to the pad 10 shown in Fig. 10, and lower pads similar to the pad 11 shown in Fig. 11. The mounting lug 38 at the right side of the clutch housing and the mounting lug 40 have similar upper and lower pads, the pads on the lug 40 being more clearly shown in Figs. 11 and 12. The upper pads of the mounting lugs at the left side of the clutch housing have straight horizontal top surfaces in a common plane, and the lower pads of the same mounting lugs have straight horizontal bottom surfaces in a common plane below the plane of the top surfaces. The upper and lower pads of the mounting lugs 38 and 40 at the right side of the clutch housing have upper and lower horizontal surfaces, respectively, corresponding to and lying in the same planes as the upper and lower surfaces of the pads on the mounting lugs 38 and 39 at the left side of the clutch housing. Figs. 11 and 12 show how the channel 4 at the right side of the tractor is fitted upon the mounting lug 40 at the right side of the clutch housing. It will be noted that the upper and lower flanges of the channel are faced at their relatively opposed sides to provide them with horizontal surfaces adapted to receive the upper and lower pads of the mounting lug 40. The vertical spacing between the horizontal surface portions at the relatively opposed sides of the flanges of the channel 4 corresponds within close limits, that is, within a few thousandths of an inch, to the vertical spacing between the horizontal top surface of the upper pad of the lug 40 and the horizontal bottom surface of the lower pad of the lug 40. The lug 38 at the right side of the clutch housing has the same close fit between the top and bottom flanges of the channel 4, and the lugs 38 and 39 at the left side of the clutch housing have the same close fits between the top and bottom flanges of the channel 5. The web of the channel 4 is drawn up tight against a vertical side surface of the lug 40 by bolts 42, as shown in Fig. 12, and by similarly disposed bolts against a vertical side surface of the lug 38 at the right side of the clutch housing. The web of the channel 5 is drawn up tight against vertical side surfaces of the mounting lugs 38 and 39 by bolts screwed into threaded holes 43 and 44 indicated in Fig. 1. The vertical side surfaces of the lugs against which the webs of the channels 4 and 5 are drawn up at the clutch housing are disposed, preferably by machining, in accurate right angle relationship to the horizontal planes of the pads on these lugs, and the vertical side surfaces are accurately spaced, transversely of the tractor, to correspond to the transverse spacing between the vertical side surfaces of the pads 12 and 13 on the housing 8 against which the webs of the channels 4 and 5 are drawn up by the bolts 14.

The forward end of the internal combustion engine is seated on an angle iron cross bar 45 secured to the lower flanges of the channels 4 and 5 from below by means of bolts and nuts as will be apparent from Fig. 1. The load of the forward portion of the engine is preferably applied to the cross bar 45 by an element 46, which may be part of a gear cover bolted to the cylinder block 15, the element 46 bearing upon an intermediate portion of the cross bar and being retained thereon by means of bolts 47.

A radiator 48, hood 49 and fuel tank 50 are mounted on the frame channels 4 and 5 as shown in Fig. 1, a detailed description of the mountings for these parts being thought unnecessary. An engine starting crank is shown at 51 and is journaled in the housing portion 8 of the front wheel support so that it can shifted on a horizontal axis longitudinally of the tractor and engaged with or disengaged from the crank shaft of the engine.

The rear axle unit comprises a rear axle housing extending transversely to a vertical longitudinal plane centrally of the tractor, the housing having an enlarged central portion forming a differential housing 52, and laterally extending hollow arms 53 with depending side portions 54 in which stub axles 55 for the rear wheels 56 are mounted in non-rotatable position. The central portion 52 of the rear axle housing has a vertical apertured front portion to which a differential carrier 57 is secured by bolts 58. The differential carrier has a forward tubular portion and a rearwardly flaring portion with an annular flange fitted to the front portion of the differential housing. Fitted into the forward tubular portion of the differential carrier is a flanged bearing cage 59, and fitted to the bearing cage is a drive shaft casing 60, the differential carrier, bearing cage and casing 60 being securely held together by bolts 61 as may be seen from Fig. 13. The drive shaft casing 60 has a tubular forward extension 62 which is telescopically received by a bearing cap 63 secured to the vertical rear wall of the transmission casing 17, concentrically with the axis of the power shaft 28. The outside diameter of the tubular extension 62 corresponds within close limits to the inside diameter of the tubular portion of the bearing cap 63 within which the extension 62 is received, and the inside diameter of the tubular extension 62 is somewhat larger than the outside diameter of the coupling sleeve 31 secured to the rear end of the power shaft 28. A suitable stuffing box arrangement, not shown in the drawings, may be provided to seal the telescopic connection between the extension 62 and the bearing cap 63.

A drive shaft 64 extends longitudinally through the drive shaft casing 60 and into the differential carrier 57. The drive shaft has a reduced end portion journaled in the differential carrier by means of a pilot roller bearing 65, and a portion of the drive shaft, forwardly of its reduced end portion, is journaled in a pair of conical roller bearings 66 seated in the bearing cage 59. Adjusting nuts 66' on the drive shaft are provided to retain the roller bearings 66 in adjusted position, and the shaft 64 is held in accurate angular position relative to a vertical transverse plane through the drive shaft casing 60, by the roller bearings 65 and 66. In this position of the drive shaft 64 its axis coincides with the axis of the forward tubular extension 62 of the casing 60. The forward end of the shaft 64 is splined and telescopically received by the internally splined coupling sleeve 31.

A differential drive pinion 67 is formed integrally with the shaft 64 between the roller bearings 65 and 66 and meshes with the ring gear 68 of a differential drive mechanism within the differential housing 52. The differential drive mechanism is of conventional construction, as shown for instance in Strehlow Patent 1,868,474 and includes differential pinions 96 carried by a case 97 rotatably mounted in bearings formed on the differential carrier 57, the bearings projecting into the differential housing 52. The forward opening of the differential housing 52 to which the differential carrier 57 is secured, is suitably shaped so as to permit the ring gear 68 to be moved through said opening in its upright position, that is, at right angles to the axis of the stub axle 55. The differential pinions 96 mesh, as usual, with side gears having internally splined hubs in which the inner ends of rear wheel drive axles 69 are telescopically received. The drive axles 69 extend through the hollow arms 53 of the rear axle housing, one of the shafts being shown in Fig. 3. Each arm 53 is formed integrally with an enlarged portion forming a housing for a brake drum 70 mounted on the drive axle 69 at the respective side of the tractor. At the side of the brake drum facing towards the differential the housing for the brake drum is closed by a partition 71 formed integrally with the arm 53, a suitable seal 72 around the drive axle 69 preventing the passage of lubricant from the differential housing into the brake drum housing. The drive axle 69 is journaled in a ball bearing 73 mounted in a bearing plate 74 which is secured to the brake drum housing as shown in Figs. 1 and 3. The opening of the brake drum housing in which the bearing plate 74 is seated, is of sufficient size to permit the removal of the brake drum 70 therethrough, the arrangement being such that the drive axle 69 with the brake drum thereon may be moved axially in and out of the rear axle housing, the telescopic connection between the axle 69 and the respective side gear of the differential permitting of such movement. A brake band operating lever 75 is mounted on a shaft 76 journaled in the upper portion of the brake drum housing, a suitable brake band and operating mechanism, not shown in Fig. 3, being provided in the brake drum housing. A cover 77 closes an opening in the top of the brake drum housing, through which opening the brake band operating mechanism is accessible. A hollow hub 78 provided with a spur gear 79 is journaled on the stub shaft 55 by means of conical roller bearings 80 and 81, and the rear wheel 56 is securely mounted on the hub 78 and retained thereon by studs and nuts 82. The spur gear 79 meshes with a pinion 83 on the outer end of the drive axle 69, whereby the driving power is transmitted to the wheel 56. The downward extension 54 of the rear axle housing has a rectangular slab 84 (Fig. 1) formed thereon to which a plate 85 is bolted, the plate 85 forming one side of a casing enclosing the spur gear 79 and pinion 83. The casing for the gear 79 and pinion 83 is completed by a stamped sheet metal cover 86 which has a flange secured to the plate 85. While only the mounting and final drive mechanism for the wheel 56 at the right side of the tractor has been described in connection with Fig. 3 it should be understood that the same arrangement is provided for the wheel 56 at the left side of the tractor.

Referring now to the connection of the rear axle unit with the frame channels 4 and 5 the following is to be noted. As more clearly shown in Figs. 4 to 9, the left frame channel 5 has its rearward end set up, preferably in an upsetting machine, into a suitable form providing mounting lugs 87 and 88. By the upsetting operation, which is substantially a forging operation performed on the heated rear end of the channel, the material of the flanges is formed into the shape of the lugs shown in Figs. 4 and 6, and the material of the web is somewhat thickened as may be seen from Fig. 9. After the forging, the rear end of the channel is faced, preferably in a milling machine, to provide a plane mounting surface, indicated by 89 in Fig. 7, at right angles to the web and to the flanges of the channel. Each mounting lug has a hole 90 in it to receive a mounting bolt 91, a spot face 92 affording a proper seat for the head of the bolt 91. The frame channel 4 at the right side of the tractor is provided with mounting lugs and a rearward plane vertical mounting surface at right angles to its web and flanges in exactly the same manner as the channel 5, the rear end of the channel 4 being shown in Fig. 13. The rear axle housing has forward seating pads 93 and 94 (Fig. 3) with straight vertical front surfaces lying in a common vertical plane. The rear surface 89 of the channel 5 abuts against the vertical front surfaces of the pads 93 and 94, and the bolts 91 are screwed into threaded holes in the seating pads to retain the channel 5 in fixed position on the rear axle housing. The rearward vertical mounting surface of the channel 4 abuts against seating pads on the rear axle housing which are exact duplicates of the seating pads 93 and 94 indicated in Fig. 3, the relative arrangement of the seating pads for the channel 4 and of the seating pads for the channel 5 being apparent from Figs. 1, 2, and 13. The vertical front surfaces of the seating pads for the frame channel 4 lie in the same plane as the vertical front surfaces of the seating pads for the frame channel 5, and this common plane of all the seating pads on the rear axle housing is accurately disposed at right angles to the axis of the drive shaft 64. It will therefore be seen that the contact of the seating pads on the rear axle housing with the vertical rear surfaces 89 of the channels 4 and 5 positions the axis of the drive shaft 64 at right angles to a vertical transverse plane through the frame channels 4 and 5. If it were not for the bolts 91, the rear axle housing could be moved vertically and horizontally on the vertical rear surfaces of the channels 4 and 5, and while so moved, the axis of the drive shaft 64 would be guided in right angle relation to the mentioned vertical transverse plane through the frame channels 4 and 5. In order to position the axis of the drive shaft 64 definitely with respect to the frame channels three additional provisions must be made, namely, the rear axle housing must be prevented from vertical displacement, it must be prevented from horizontal displacement transversely to a vertical plane longitudinally of the tractor, and it must be prevented from horizontal displacement longitudinally of the tractor. The bolts 91 are intended to serve all these purposes, and if they are to do so properly, they must fit accurately into the holes 90, or else there would be a possibility for vertical and horizontal displacement of the rear axle housing relative to the frame channels, or, at least, the bolts could not be relied upon to definitely position the rear axle housing horizontally and vertically, transversely of the frame channels. The required accurate fit is provided by a shank portion 95 (Fig. 7) on each bolt 91, the diameter of the shank portion corresponding within close limits, that is, within a few thousandths of an inch, to the diameter of its corresponding hole 90. The bolts 91, in addition to their function of drawing the frame channels and rear axle housing together, therefore, serve as dowel elements to position and retain the rear axle housing definitely relative to the channels vertically and horizontally transversely of the tractor.

From the foregoing it will be clear that the axis of the drive shaft 64 is positioned and retained in right angle relationship to a vertical transverse plane through the frame channels 4 and 5 and in horizontally and vertically fixed relation to the channels. The same is true of the axis of the power shaft 28. The clutch housing 16, as has been explained hereinbefore, is fitted between the upper and lower flanges of the channels 4 and 5, the lugs 38 at opposite sides of the clutch housing and the lugs 39 and 40 rearwardly of the lugs 38 being received between accurately spaced and horizontally disposed surfaces at the relatively opposed sides of the channel flanges. Due to this arrangement and due to the rigid bolting of the transmission housing 17 to the clutch housing 16 the axis of the power shaft 28 is positioned in a horizontal plane at right angles to a vertical transverse plane through the frame channels, and the mentioned arrangement also definitely positions and retains the axis of the power shaft 28 in vertically fixed relation to the frame channels. The bolts 42 which draw the webs of the channels against the straight vertical side surfaces of the mounting lugs 38, 39, and 40 insure a definite position of the axis of the shaft 28 in a vertical plane, longitudinally of the tractor at right angles to a vertical transverse plane through the frame channels, and the bolts 42 also retain the clutch housing 16, and therefore the power shaft 28, against displacement longitudinally of the frame channels. In order to insure correct alinement of the shafts 28 and 64, which is necessary on account of the coupling of these shafts by the rigid sleeve 31, the faced portions of the channel flanges between which the mounting lugs of the clutch housing are fitted, must be accurately related to the vertical rear surfaces 89 of the channels, and the holes 90 in the mounting lugs 87 and 88 of the channels must likewise be accurately related to the faced portions of the channel flanges between which the mounting lugs of the clutch housing are fitted. The channels, as will be obvious, are made from standard rolled stock, and such stock as it comes from the mill is seldom, if ever, perfectly accurate but generally more or less distorted by bends and twists and possibly otherwise out of shape. In order to prevent such inaccuracies of the rolled stock from interfering with the required accurate relative positions of the clutch housing and the rear axle housing various provisions may be made but the following manner of accomplishing the desired result is here preferred. After the channel has been set up at one end, as shown in Figs. 4 to 9, it is placed into a machine where it is secured in a definite position on a support, and then operated upon by two milling cutters, one forming the plane rear surface 89, and the other forming three pairs of straight surface portions 96, 97, 98 at the relatively opposed sides of the flanges. During these operations the channel is kept in its definite position on the support so that the rear surface 89 and the surface portions 96, 97, 98 will be accurately related to each other. The surface portions 96, 97, and 98 on each flange lie in a common plane at right angles to the rear surface 89 and at right angles to the web of the channel. The forward pair of surface portions 96 is the one between which the upper housing of the front wheel support is fitted as shown in Figs. 1 and 10. The intermediate pair of surface portions 97 is the one between which the mounting lugs 38 and 39 of the clutch housing are fitted in the manner disclosed in Fig. 11. The rearward pair of surface portions 98 receives no part in the tractor as shown but serves to properly position the channel while the holes 90 are drilled and reamed into the mounting lugs 87 and 88, which is done in another machine. The holes 90 together with holes in the web of the channel for receiving the bolts 14 and the bolts 42, and if desired other holes, are preferably drilled into the channel in a multiple spindle drilling machine, in which the channel is retained on a support fitting between the faced portions 96, 97 and 98.

Referring now to the assembling and disassembling of the tractor, it has been found convenient for work along an assembly line to start with the rear axle unit, that is, with a unit comprising the rear axle housing, with the differential carrier 57, bearing cage 59 and drive shaft casing 60 secured thereto, and the drive shaft 64, drive axles 69 and hollow hubs 78 all mounted in place. Coming down the assembly line this unit meets the engine and transmission unit comprising the engine 2, clutch housing 16, and transmission housing 17 all secured together, and the engine crank shaft 18, clutch shaft 21, power shaft 28, coupling sleeve 31 and bearing cap 63 all mounted in place. The two units are assembled by merely pushing the tubular extension 62 of the drive shaft casing 60 into the bearing cap 63. While this is done the splined forward end of the drive shaft 64 automatically enters the coupling sleeve 31, the bearings 65 and 66 holding the drive shaft 64 in such position that its axis, at the forward end, practically coincides with the axis of the tubular extension 62, as has been mentioned hereinbefore. After the rear axle unit and the engine and transmission unit have been assembled the front wheel support is placed into its position in front of the engine and the channels 4 and 5 are put in place and secured to the rear axle housing by the bolts 91, to the clutch housing 16 by the bolts 42, and to the front wheel support by the bolts 14.

For purposes of inspection or repair the rear axle unit may be removed by taking out the bolts 91 and rolling the rear axle unit away on its own wheels; a proper support for the frame channels, as by a jack, would of course have to be provided. When the rear axle unit is rolled away it parts from the engine and transmission unit at the telescopic connections 31, 64 and 62, 63. If it is desired to have the rear axle housing part from the differential carrier 57 in order to expose the differential drive mechanism, the drive axles 69 may first be disconnected from the splined hubs of the differential side gears by pulling the axles 69 out axially, for which purpose the wheels 56 will have to be removed. The wheels 56 may then be replaced upon the hubs 78 and, after the bolts 58 and 91 have been taken out, the rear axle housing may be rolled away, parting from the differential carrier and exposing the differential drive mechanism which is supported by the differential carrier 57. In this case the drive shaft casing 60, bearing cage 59 and differential carrier 57 may remain in place on the tractor.

After the rear axle unit including the drive shaft casing 60 has been removed the change speed transmission mechanism may be removed by disconnecting the transmission housing 17 from the clutch housing 16, the transmission housing being entirely supported on the clutch housing and having no direct connection with the frame channels. If it is desired to remove the whole engine and transmission unit this may be done by pulling this whole unit out rearwardly after the rear axle unit has been removed and the bolts 42 have been taken out and the engine has been disconnected from the cross bar 45. In taking out the engine and transmission unit the channels 4 and 5 must be slightly spread apart as the mounting lugs 38, 39, and 40 of the clutch housing cannot slide on the flanges of the channels all the way back as should be apparent from Figs. 4 and 5. The front wheel unit may be removed separately by pulling it out forwardly after the bolts 14 have been taken out. In reassembling the units they will take their proper positions accurately without effort due to the mentioned arrangement of the faced portions of the frame channels.

The drive shaft casing 60 has a flanged aperture 98 to which a power lift attachment may be secured as shown in Figs. 13 and 14. In Fig. 2 the power lift attachment is omitted and the aperture 98 closed by a cover 99. The main shaft of the power lift attachment is indicated by 100 in Figs. 13 and 14, and is journaled in a support comprising a tubular portion 101 and a housing portion 102. The housing portion is seated on the flanged portion of the drive shaft casing 60 and is secured thereto by bolts 103, while the tubular portion 102 has mounting ears 104 which are seated on the top flange of the frame channel 4 and are secured thereto by bolts and nuts 105. Secured to the main shaft 100 within the housing portion 102 by means of a rivet 106 is a worm gear 107 which meshes with a worm 108 secured to the drive shaft 64. A half-revolution clutch 109 of the character described in Strehlow Patent 1,868,474 is mounted on the main shaft 100 laterally of the channel frame 4, and a suitable trip mechanism 110 for the half-revolution clutch is mounted on the web of channel 4 by means of a bolt and nut 111. It should be noted that the support 101, 102 with the main shaft 100 journaled therein and the worm gear 107 and half-revolution clutch 109 secured to the main shaft, form a unit which may be readily attached to and removed from the tractor, the worm 108 remaining on the drive shaft 64. In putting the unit in place upon the tractor the worm gear 107 may readily be brought in mesh with the worm 108 due to the fact that the unit may freely be moved horizontally in all directions and vertically, complete freedom of bringing the gears in mesh being thus afforded, and after proper mesh of the gears has been established the support 101, 102 may be moved on the casing 60 and channel 4 into proper position so that the bolts 103 and 105 can be inserted. Rearwardly of the worm 108 within the casing 60 a web 112 rises from the bottom of the casing, the web terminating below the shaft 64 but above the lowest points of the worm 108. The forward portion of the casing 60 may therefore be filled with lubricant up to a level which is high enough to keep the lower portion of the worm 108 immersed in lubricant. It will be seen that it is not necessary to drain this lubricant from the casing 60 and that none of it will be lost in attaching the power lift unit to and removing it from the tractor, the unit being attached to the casing 60 from above.

The belt pulley shaft 41, mentioned hereinbefore, is rotatably mounted in a sleeve 113 by means of a ball bearing 114 seated in the sleeve 113 at one end thereof and by means of a roller bearing 115 seated in the sleeve 113 at the other end thereof. The outer race of the ball bearing 114 abuts against a shoulder of the sleeve 113 and is retained by a snap ring 116, and the outer race of the roller bearing 115 is similarly secured within the sleeve 113. The inner race of the ball bearing 114 is axially retained on the shaft 41 by a shoulder and a snap ring 117, and the shaft is thus prevented from axial displacement within the sleeve 113. A bevel gear 118 is integrally formed with the shaft 41 and meshes with a bevel gear 119 keyed to the clutch shaft 21, and a belt pulley 120 is secured to the outer end of the shaft 41 projecting from the sleeve 113. A suitable dust seal, not shown, may be mounted in the outer end of the sleeve 113 at the side of the roller bearing 115 facing the hub of the belt pulley 120. The inner end of the sleeve 113 is slidingly fitted into a bore of an internal web 121 of the clutch housing 116, the diameter of the bore corresponding within close limits to the outside diameter of the portion of the sleeve 113 seated in the bore. An intermediate portion of the sleeve 113 is slidingly fitted into a bore of the mounting lug 40 of the clutch housing 16, the channel having an aperture registering with the bore in the lug 40. An oil seal 125, preferably in the form of a cork ring, is retained in a counterbore in the lug 40 by the web of channel 4, and an annular web 139 projects inwardly from the sleeve 113, whereby lubricant into which the lower portion of the bevel gear 118 may be immersed, will be prevented from flowing out of the clutch housing. The outside diameter of the sleeve portion which is seated in the bore of the lug 40 is the same as the outside diameter of the sleeve portion seated in the web 121, and the bore of the lug 40 corresponds within close limits to said outside diameter. A portion of the sleeve intermediate the seats afforded by the bores in the web 121 and lug 40 is slightly reduced in diameter and provided with a series of holes 122 and with an annular groove 123, the holes 122 being tapered to receive the tapered end of a set screw 124 which is screwed into a threaded hole of a wall portion of the clutch housing 16. The holes 122 are arranged on a helical line around the axis of sleeve 113, as may be seen from Figs. 11 and 12, the holes being equally spaced from each other circumferentially of the sleeve, that is, if there are six holes in the sleeve, the holes will be angularly offset sixty degrees relative to each other. As to the relative spacing of the holes in the direction of the sleeve axis the showing of Figs. 11 and 12 is greatly exaggerated in order to make the helical character of the arrangement of the holes readily visible, but in actual construction the relative spacing of the holes in the direction of the sleeve axis is less than a small fraction of an inch, for instance, about five thousandths of an inch. Fig. 12 shows two of the holes 122 at opposite sides of the set screw 124, one of the holes being closer to the groove 123 and the other being farther from the groove than the center of the set screw 124. By first loosening the lock nut 126 on the set screw and then screwing the set screw back the tapered end of the set screw may be withdrawn from the hole 122 in the sleeve in which it is shown in Fig. 11. The sleeve is then free to be rotated about its axis and also to be moved back or forth in the direction of its axis. For purposes of description it may be assumed that the sleeve is rotated in a direction so as to bring the hole 122 which in Fig. 12 is farthest from the groove 123, underneath the tapered end of the withdrawn set screw 124, a rotation of the sleeve through an angle of sixty degrees being necessary for this purpose where the angular spacing of the holes is sixty degrees as mentioned above. The set screw 124 may then be screwed down again and will enter the new hole 122 even if the center of the hole was not brought into perfect coincidence with the center of the set screw, the tapered end of the set screw and the correspondingly tapered shape of the hole 122 taking care of such slight inaccuracy in rotating the sleeve 113 by hand into the new position. As the set screw 124 is screwed down and tightly wedged into the new hole 122 the sleeve is again positively fixed in position but the new position differs from the original one in that the sleeve has been moved in the direction of its axis a very short distance farther into the clutch housing 16, the relative axial spacing of the holes 122 being very short, as stated. It will be seen that due to the helical arrangement of the holes 122 about the axis of the sleeve 113 the sleeve may be moved in or out relative to the clutch housing in the described manner for very short but definite distances, and an inexpensive, simple and efficient way of regulating the depth of mesh of the bevel gears 118, 119 without the use of shims is therefore provided. In order to find the proper axial position of the sleeve 113 in which the bevel gears 118, 119 have their proper depth of mesh, which is indicated by the backlash of the pulley shaft 41, it is usually necessary to try different holes 122 when the belt pulley unit is mounted in the tractor for the first time. After the proper position has been found an arrow 127 (Fig. 12) is stamped on the sleeve 113 opposite to an arrow 128 on the frame channel 4, alinement of the arrows indicating the angular position of the sleeve in which the set screw 124 engages the hole 122 which has been found to afford the proper depth of mesh of the bevel gears. If it is desired to disengage the bevel gears 118, 119 from each other so that the belt pulley may remain stationary while the clutch shaft 21 revolves, the set screw 124 is withdrawn from the tapered hole in which it is shown in Fig. 11, whereupon the sleeve 113 may be moved outwardly by pulling on the belt pulley 120 until the groove 123 registers with the withdrawn set screw 124. In this position the sleeve will still be seated in the bore of the web 121, and by screwing the set screw down into the groove 123 the sleeve will be held in a position in which the bevel gears are out of mesh. In order to bring the bevel gears again in mesh with each other the operation is reversed, and in keeping the arrow 127 of the sleeve during this operation in alinement with the arrow 128 of the frame channel 4 the hole 122 which affords the correct depth of mesh may readily be registered with the set screw 124. Generally speaking, the relative spacing of the holes 122 in the direction of the axis of the sleeve 113 is a small fraction of the total depth of mesh of the bevel gears 118, 119 while the spacing between the groove 123 and the hole 122 nearest thereto, in the direction of the sleeve axis, is larger than the total depth of mesh of the bevel gears. If desired, the sleeve 113 with the shaft 41 journaled therein, together with the bevel gear 118 and the belt pulley 120, may be entirely withdrawn from the clutch housing, the maximum diameter of the bevel gear 118 being somewhat shorter than the diameters of the bores in the web 121 and lug 40 so that the bevel gear 118 can pass therethrough. The opening in the channel 4 which registers with the bore in the lug 40 may then be closed by a suitable cover.

The bevel gears 118 and 119 are enclosed in a gear compartment of the clutch housing 16, the compartment being formed by an inclined bottom wall 127 (Fig. 15), a vertical front wall 126, a vertical side wall 129 (Fig. 16), the web 121, and the upper part of the rear wall 130 of the clutch housing. The top of the gear compartment is closed by a cover 131. The transmission housing 17 has a front wall 132 abutting against the rear wall 130 of the clutch housing, and within the transmission housing, next to the front wall 132 thereof, are the intermeshing gears 133 and 134, the gear 133 being integrally formed with the clutch shaft 21 and the gear 134 forming part of the countershaft gear 35 mentioned hereinbefore. It is desirable that the oil level in the transmission housing 17 be kept below the variable speed shaft 28 approximately at the height indicated in Fig. 15, and, on the other hand, it is desirable to maintain an oil level in the gear compartment of the clutch housing at a height below the clutch shaft 21 and below the belt pulley shaft 41, the belt pulley shaft extending at right angles to the clutch shaft in a horizontal plane through the axis of the latter. The desired oil level in the gear compartment is indicated in Fig. 15 and is higher, as will be seen, than the oil level in the transmission housing 17. When the engine of the tractor is running it rotates the clutch shaft 21, provided that the clutch mechanism 20 is engaged, and the gear 134 due to its mesh with the gear 133 will be revolved. The teeth of the gear 134, as they emerge from the oil in the transmission housing, are loaded with oil, the amount of oil clinging to the teeth of the gear being rather substantial if, according to usual practice, a relatively thick oil is used in the transmission housing. Only a small portion of the oil which clings to the teeth of the gear 134 can pass between the intermeshing gears 133 and 134, the remainder backing up ahead of the point of mesh and forming a spouting body of lubricant rising above the normal oil level which is indicated in Fig. 15, the spouting action being effective not only in the plane of the intermeshing gears but also transversely to said plane. This phenomenon is utilized to circulate some of the lubricant contained in the transmission housing 17, through the gear compartment of the clutch housing 16 and to maintain lubricant in said gear compartment at the level indicated in Fig. 15. In Fig. 16 the pitch circles of the gears 133 and 134 are indicated in dash dotted lines, and the arrows in each circle indicate the directions in which the gears are rotated by the engine of the tractor. The rear wall 130 of the clutch housing has a hole 135 in it, and the front wall 132 of the transmission housing has a similar hole 137 in it concentric with the hole 135 in the rear wall of the clutch housing. The center of the hole 135 is so located with respect to the pitch circles of the gears 133 and 134 that some of the lubricant which builds up near the relatively approaching teeth of the intermeshing gears, as mentioned above, is spouted through the hole 137 in the front wall of the transmission housing and through the hole 135 in the rear wall of the clutch housing into the gear compartment of the latter. It should be noted that the holes 135 and 137 are not directly below the axis of shaft 21 but positioned laterally of the common vertical plane of the shafts 21 and 36 and above the pitch circle of the gear 134 in proximity to the latter and also in proximity to the pitch circle of the gear 133. At the point where the holes 135 and 137 are located as shown in Fig. 16 the transverse spouting of the lubricant is sufficiently effective to force lubricant into the gear compartment of the clutch housing under such pressure that the oil therein may rise to a level considerably higher than that indicated in Fig. 15. As it is not desirable, however, to raise the oil level in the gear compartment higher than indicated in Fig. 15 an outlet hole 136 is drilled into the rear wall of the clutch housing 16 near the bottom wall 127 of the gear compartment, as shown in Figs. 16 and 17, and a similar hole 138 concentric with the hole 136 is drilled into the front wall 132 of the transmission housing 17. The holes 135 and 137 and the holes 136 and 138 are so positioned and proportioned that a circulation of lubricant therethrough takes place at the proper rate to maintain the desired oil level in the gear compartment. As shown in Fig. 16, the hole 136 in the rear wall of the clutch housing is located at the side of a vertical plane through the shafts 21 and 36 where the teeth of the intermeshing gears 133 and 134 recede from each other, and as there is no back pressure at this side of the gears within the transmission housing the oil from the gear compartment will flow back into the transmission housing through the hole 136 and through the hole 138 in the front wall of the transmission housing.

It should be understood that it is not intended to limit the invention to the exact details of construction herein shown and described, for various modifications within the scope of the claims may occur to persons skilled in the art.

It is claimed and desired to secure by Letters Patent:

1. In a motor vehicle, a support, a drive shaft arranged in angularly fixed relation to said support, a housing, a power shaft arranged in angularly fixed relation to said housing, coupling means between said shafts, frame members of rolled stock extending longitudinally of the vehicle at opposite sides thereof, each of said frame members having rearward and forward mounting surfaces accurately shaped thereon in predetermined relation to each other and engaged, respectively, by said support and housing, and means for retaining said support and housing in such positions relative to each other on said rearward and forward mounting surfaces of said frame members as to insure true alinement of said power shaft with said drive shaft independently of any other connections between said support and housing.

2. In a motor vehicle, a wheeled support at the rear of the vehicle, a drive shaft arranged in angularly fixed relation to said support, a housing, a power shaft arranged in angularly fixed relation to said housing, coupling means between said shafts, and frame members of rolled stock extending longitudinally of the vehicle at opposite sides thereof, each of said frame members having rearward and forward mounting surfaces accurately shaped thereon in predetermined relation to each other and engaged, respectively by said support and housing, means associated with said support and housing, respectively, for positioning said support and housing in such relation to each other on said rearward and forward mounting surfaces of said frame members as to insure true alinement of said shafts independently of any other connections between said support and housing, and means for securing said support, housing and frame members together.

3. In a motor vehicle, a support, a drive shaft arranged in angularly fixed relation to said support, a housing, a power shaft arranged in angularly fixed relation to said housing, coupling means rigidly connecting said shafts, a pair of frame members extending longitudinally of the vehicle at opposite sides thereof and having vertical webs and inwardly directed top and bottom flanges, said top and bottom flanges of each frame member having faced portions at their relatively opposed sides, mounting lugs on each frame member at the end thereof adjacent to said support, means including dowel elements for securing said mounting lugs of each frame member to said support, mounting lugs at opposite sides of said housing and closely fitted between said faced portions of said top and bottom flanges of said frame members, and means for securing said frame members to said housing.

4. In a motor vehicle, a differential housing, a drive shaft casing extending forwardly from said differential housing and rigidly secured thereto, a pair of frame members extending longitudinally of the vehicle at opposite sides thereof and having vertical webs and inwardly directed top and bottom flanges, said top and bottom flanges of each frame member having faced portions at their relatively opposed sides, mounting lugs on each frame member at the end thereof adjacent to said support, means including dowel elements for securing said mounting lugs of each frame member to said differential housing, a transmission casing having a rearward end portion telescopically engaging a forward end portion of said drive shaft casing, supporting means for said transmission casing including mounting lugs closely fitted between said faced portions of said top and bottom flanges of each frame member, and means for securing said frame members to said supporting means.

5. In a motor vehicle, a wheeled support at one end of the vehicle, a pair of frame channels extending longitudinally of the vehicle at opposite sides thereof and having their webs disposed in vertical planes, each frame channel having at its end adjacent to said support an upper and a lower mounting lug integrally formed thereon, said upper mounting lug extending upwardly from the top flange of the channel and said lower mounting lug extending downwardly from the bottom flange of the channel, and means for securing said mounting lugs of each frame channel on said support.

6. In a motor vehicle, a wheeled support at one end of the vehicle, a pair of frame channels extending longitudinally of the vehicle at opposite sides thereof and having their webs disposed in vertical planes, each frame channel having at its end adjacent to said support an upper and a lower mounting lug integrally formed thereon, said upper mounting lug extending upwardly from the top flange of the channel and said lower mounting lug extending downwardly from the bottom flange of the channel, and connecting elements extending longitudinally of the vehicle through said mounting lugs, for securing said frame channels to said support.

7. In a motor vehicle, a support, a pair of frame members extending longitudinally of the vehicle at opposite sides thereof and having vertical webs and inwardly directed top and bottom flanges, said top and bottom flanges of each frame member having faced portions at their relatively opposed sides, mounting lugs on each frame member at the end thereof adjacent to said support, means including dowel elements for securing said mounting lugs of each frame member to said support, a housing between said frame members having side portions closely fitted between said faced portions of said top and bottom flanges of each frame member, and means for securing said frame members to said side portions of said housing.

8. In a motor vehicle, a wheeled rear support, a pair of frame channels extending longitudinally of the vehicle at opposite sides thereof and having their webs disposed in vertical planes and their top and bottom flanges directed inwardly, mounting lugs on each frame channel at the end thereof adjacent to said support, means for securing said mounting lugs of each frame channel on said rear support, a wheeled front support having side portions fitted between said top and bottom flanges of each frame channel, and means for securing said frame channels to said front support.

9. In a motor vehicle, a wheeled rear support, a pair of frame channels extending longitudinally of the vehicle at opposite sides thereof and having their webs disposed in vertical planes and their top and bottom flanges directed inwardly, mounting lugs on each frame channel at the end thereof adjacent to said support, connecting elements extending longitudinally of the vehicle through said mounting lugs for securing said frame channels to said rear support, a wheeled front support having side portions fitted between said top and bottom flanges of each frame channel, and connecting elements extending through said frame channels for securing said frame channels to said side portions of said front support.

10. In a motor vehicle, a wheeled rear support, a pair of frame members extending longitudinally of the vehicle at opposite sides thereof and having vertical webs and inwardly directed top and bottom flanges, said top and bottom flanges having, intermediate the ends of each frame member and at the forward end of each frame member, faced portions at their relatively opposed sides, mounting lugs on each frame member at the end thereof adjacent to said support, means including dowel elements for securing said mounting lugs of each frame member to said rear support, a power unit including a housing having side portions closely fitted between said intermediate faced portions of said top and bottom flanges of each frame member, a wheeled front support having side portions fitted between said forward faced portions of said top and bottom flanges of each frame member, and means for securing said frame members to said power unit and to said front support.

CONRAD E. FRUDDEN.
WALTER F. STREHLOW.